US010387832B2

(12) United States Patent
Liberman et al.

(10) Patent No.: US 10,387,832 B2
(45) Date of Patent: Aug. 20, 2019

(54) COORDINATION SYSTEM FOR SYSTEM MAINTENANCE AND REFURBISHMENT OF RELATED COMPONENTS

(71) Applicant: Florida Power & Light Company, Juno Beach, FL (US)

(72) Inventors: Amir Liberman, Loxahatchee, FL (US); Gina Guarino, Jupiter, FL (US); Matthew Brazauskas, Royal Palm Beach, FL (US); Michael Meister, North Palm Beach, FL (US); Paul Czerniak, North Palm Beach, FL (US)

(73) Assignee: Florida Power & Light Company, Juno Beach, FL (US)

( * ) Notice: Subject to any disclaimer, the term of this patent is extended or adjusted under 35 U.S.C. 154(b) by 252 days.

(21) Appl. No.: 15/376,804

(22) Filed: Dec. 13, 2016

(65) Prior Publication Data

US 2018/0165641 A1 Jun. 14, 2018

(51) Int. Cl.
*G06Q 10/10* (2012.01)
*G06Q 10/08* (2012.01)

(52) U.S. Cl.
CPC ..... *G06Q 10/0875* (2013.01); *G06Q 10/1097* (2013.01)

(58) Field of Classification Search
CPC ....................... G06Q 10/1097; G06Q 10/0875
See application file for complete search history.

(56) References Cited

U.S. PATENT DOCUMENTS 5,331,579 A 7/1994 Maguire, Jr. et al.
5,369,570 A 11/1994 Parad
(Continued)

FOREIGN PATENT DOCUMENTS

EP 1179795 2/2002
JP 2002195056 7/2002
(Continued)

OTHER PUBLICATIONS

Srinath Raghavan et al., State Diagram-Based Life Cycle Management Plans for Power Plant Components, Mar. 2015, IEEE Transactions on Smart Grid, vol. 6, No. 2, pp. 965-972.*
(Continued)

*Primary Examiner* — Mischita L Henson
(74) *Attorney, Agent, or Firm* — Jeffrey N. Giunta; Fleit Gibbons Gutman Bongini & Bianco P.L.

(57) ABSTRACT

Systems and methods of managing operational system components. Maintenance schedules for each of a number of systems are maintained. A worn component scheduled to be replaced in an initial system is identified. An identified component that is scheduled to be removed from another systems and that is able to replace the worn component is identified. Based on the maintenance schedules associated with the systems, the identified component is able to be refurbished after its scheduled removal from the selected remote system in time to be used as a replacement for worn component when it is scheduled to be removed from the initial system. An indication associated with the identified component is stored that indicates that the identified component is scheduled to be: removed from the other system; refurbished; and installed into the initial system at the time of the scheduled removal of the worn component.

18 Claims, 9 Drawing Sheets

(56) References Cited

U.S. PATENT DOCUMENTS

| | | | |
|---|---|---|---|
| 6,785,586 | B1 | 8/2004 | Toprac et al. |
| 6,801,819 | B1 | 10/2004 | Barto et al. |
| 6,901,318 | B1 | 5/2005 | Morronigiello et al. |
| 6,904,329 | B1 | 6/2005 | Barto et al. |
| 6,983,188 | B2 | 1/2006 | Loughran et al. |
| 7,043,414 | B2 | 5/2006 | Brown |
| 7,127,310 | B1 | 10/2006 | Barto et al. |
| 7,716,077 | B1 | 5/2010 | Mikurak |
| 2002/0035457 | A1 | 3/2002 | Brown |
| 2004/0078257 | A1 | 4/2004 | Schweizer et al. |
| 2005/0234577 | A1 | 10/2005 | Loughran et al. |
| 2008/0002995 | A1 | 1/2008 | Kamisuwa et al. |
| 2008/0021604 | A1 | 1/2008 | Bouvier et al. |
| 2009/0199192 | A1 | 8/2009 | Laithwaite et al. |
| 2015/0132550 | A1 | 5/2015 | Kohno et al. |

FOREIGN PATENT DOCUMENTS

| | | |
|---|---|---|
| JP | 2002197212 | 7/2002 |
| JP | 2006073019 | 3/2006 |
| JP | 2008009990 | 1/2008 |
| JP | 2008065824 | 3/2008 |
| JP | 2009199596 | 9/2009 |
| JP | 2009217718 | 9/2009 |
| WO | 200036479 | 6/2000 |
| WO | 20080144101 | 11/2008 |

OTHER PUBLICATIONS

Christie®, "TCO Calculator", https://www.christiedigital.com/en-us/visual-solutions-case-studies/tools/tco-calculator, Accessed in Jul. 2016, pp. 1-2.

Dept. of the Army, "Army Maintenance Policy", Army Regulation 750-1, Sep. 12, 2013, pp. 1-223.

Schlake, B., "Impact of automated condition monitoring technologies on railroad safety and efficiency", Thesis submitted at the Graduate College of the University of Illinois at Urbana-Champaign, 2010, pp. 1-143.

Peoplesoft®, "EnterpriseOne B73.3.1 Equipment/Plant Maintenance PeopleBook", Jun. 1999, pp. 1-590.

Wheeler, K., et al., "A Survey of Health Management User Objectives Related to Diagnostic and Prognostic Metrics", Proceedings of the ASME 2009 International Design Engineering Technical Conferences and Computers and Information in Engineering Conference, American Society of Mechanical Engineers, Aug. 2009, pp. 1-20.

* cited by examiner

500

PLANT A PARTS TO BE REPLACED AT AOUTAGE

| | PART TYPE (502) | SERIAL NUMBER (504) |
|---|---|---|
| 510 | PART N | 123 |
| 512 | PART M | 24 |
| 514 | PART Z | 5 |

PLANT B PARTS TO BE REPLACED AT OUTAGE

| | PART TYPE (602) | SERIAL NUMBER (604) | TIME TO REFURBISH (606) | CANDIDATE FOR PLANT A OUTAGE (608) |
|---|---|---|---|---|
| 610 | PART N | 456 | 2 MONTHS | NO |
| 612 | PART M | 18 | 1 MONTH | YES |

PLANT C PARTS TO BE REPLACED AT OUTAGE

| | PART TYPE (702) | SERIAL NUMBER (704) | TIME TO REFURBISH (706) | CANDIDATE FOR PLANT A OUTAGE (708) |
|---|---|---|---|---|
| 710 | PART N | 590 | 2 MONTHS | YES |
| 712 | PART M | 40 | 1 MONTH | YES |
| 714 | PART Z | 18 | 3 MONTHS | YES |

FIG. 7

COORDINATION SYSTEM FOR SYSTEM MAINTENANCE AND REFURBISHMENT OF RELATED COMPONENTS

FIELD OF THE DISCLOSURE

The present disclosure generally relates to automated management of systems maintenance, and more particularly to coordinating maintenance activities of different systems to allow effective component reuse.

BACKGROUND

Maintenance and operational organizations often operate a number of related systems that utilize similar components. Maintenance of these systems often includes replacing components that wear out during normal operations. These components can be replaced with new components or with components that were previously removed from one system and refurbished for reuse.

Maintaining these systems is often efficiently performed by stopping at least some of the operations of a system so that maintenance operations can be performed. In an example, a public electric utility operates and maintains several electrical generating plants that are required to have maintenance performed according to defined schedules. Some maintenance activities for these plants are performed while the plant is shut down and not producing electricity to its full capacity or even at all, a condition referred to as an "outage." Scheduling the maintenance of these plants includes ensuring that a sufficient number of other plants are operating during a scheduled outage of one plant to meet the electrical demands of the utility while the plant being maintained is in its outage.

In the example of an electric utility, the electric utility may operate a number of power generation plants that include similar equipment that are able to use the same models of wearable components. For example, a number of different power generation plant locations may use gas powered turbines that are manufactured by the same manufacturer or that use the interchangeable wearable components. These different power generation plants sometimes use the same wearable component or wearable components that are sufficiently similar so as to be interchangeable. In an example, such interchangeable parts are referred to as parts that are "pooled." In some scenarios, a wearable component that is removed from one plant is able to be refurbished and that refurbished part is able to be installed into another plant that uses that wearable component.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 illustrates a plant A parts removal list, according to an example;

FIG. 6 illustrates a plant B parts removal list, according to an example;

FIG. 7 illustrates a plant C parts removal list, according to an example;

and

Figure 11:
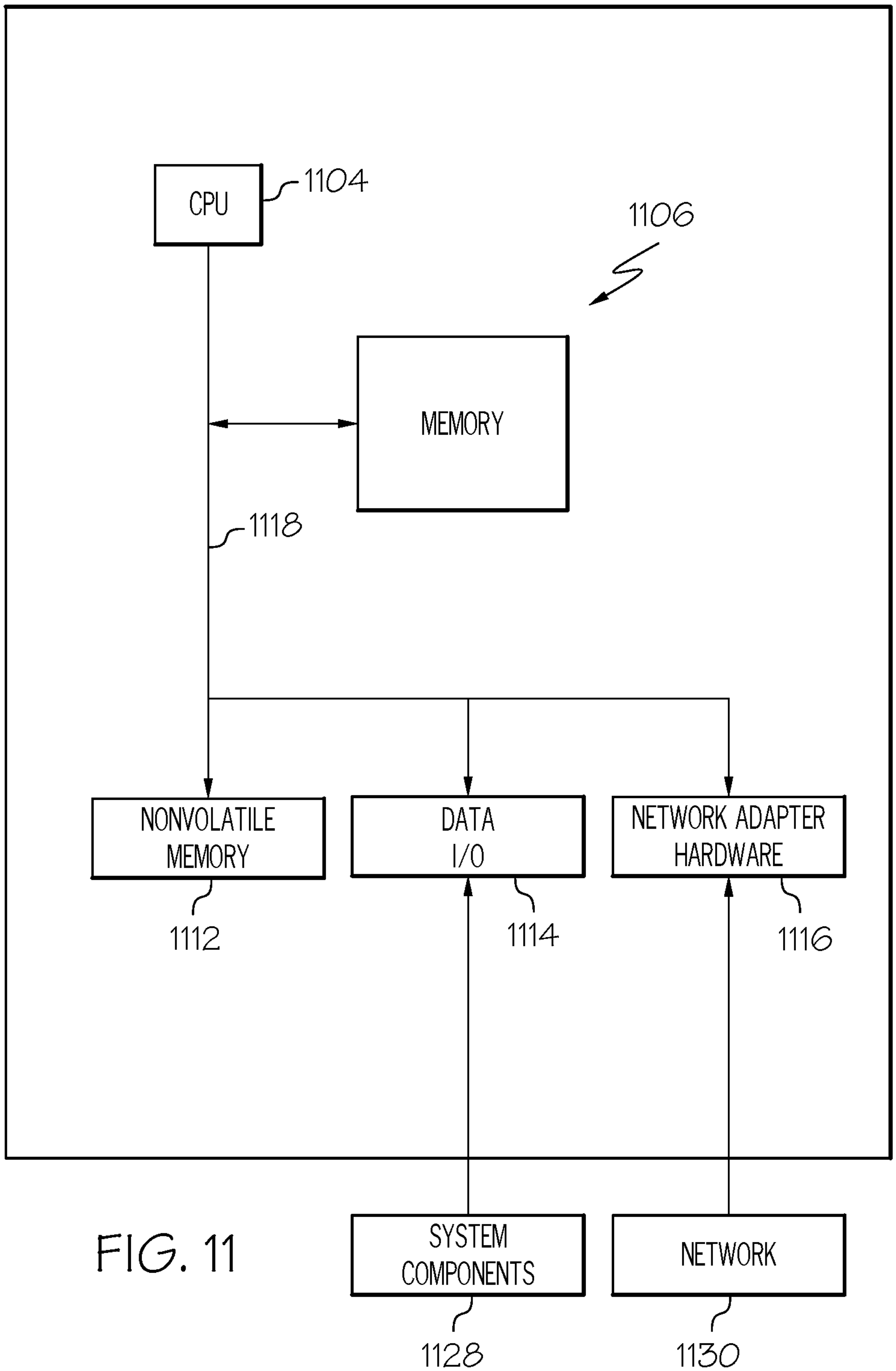

FIG. 11 illustrates a block diagram illustrating a controller, according to an example.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to identify, track, and generally manage the refurbishing of replacement wearable components that can be used in multiple systems. An example implementation of these systems and methods is managing the extraction, refurbishment and installation of refurbished wearable components used in combustion turbines powering electrical generators operated by utilities that use very expensive replacement components.

In an example, the below described systems and methods identify a particular wearable component that is currently installed in a first system where that wearable component is scheduled to be extracted from that first system and refurbished for reinstallation into another, second, system. These systems and methods in an example identify a particular second system into which that refurbished component is to be used as a replacement component at a scheduled maintenance time, where that refurbished component is scheduled to be removed from the first system and have its refurbishment completed prior to the scheduled maintenance time of that particular second system. The system maintains and adjusts the maintenance schedules for all of the systems and maintains data defining the time needed to refurbish each component in order to identify which particular component from which particular first system will be available for installation into the second system at its maintenance time. In various examples, the timing of maintenance activities, such as plant outages, as well as the set of maintenance actions to be undertaken during each scheduled maintenance activity, are all able to be adjusted to determine a composite schedule of all of the maintenance activities that are to be performed by an organization maintaining a number of systems.

The following systems and methods in an example are able to further iteratively adjust the scheduled maintenance activities of one or more systems and determine changes in costs that occur by shifting scheduled maintenance times by various time offsets. For example, if the maintenance time is shifted to an earlier time, the component being replaced may not be utilized for its full lifetime and an increase in total costs may be incurred. If the maintenance time is shifted to a later time, a cost savings may be realized due to extended use of the component being replaced. In some cases, shifting the maintenance time impacts the cost of the replacement component because a lower cost refurbished component may be available at the modified maintenance time whereas a new component or otherwise more expensive component would be scheduled to be used at the originally scheduled maintenance time.

In various examples, the below described systems and methods determine cost changes based on: 1) modifying the maintenance time of a system to be serviced; B) modifying the maintenance time of a remote system from which a replacement component will be removed and refurbished so that it is available to be installed at the system to be serviced at the maintenance time, or both of these scenarios. The scheduled maintenance activities, as well as the maintenance tasks performed during each scheduled maintenance activity, are able to be iteratively adjusted in an example in order to lower the aggregate costs of performing all of the scheduled maintenance activities on all of the systems being maintained by an organization.

In an example, the below described systems and methods support improving inventory management by reducing a number of pooled parts that are maintained in inventory, increasing the number of refurbished parts that are able to be used, reducing the amount of time that a refurbished part is to be kept in inventory prior to installation into a plant, achieving other inventory cost reductions or inventory efficiency goals, or combinations of these. In an example, the below described systems and methods are able to be iteratively performed to increase or decrease a metric such as overall operating costs. In some examples, various optimization techniques using various metrics are able to be used to improve the overall efficiency of plant operations.

Figure 1:
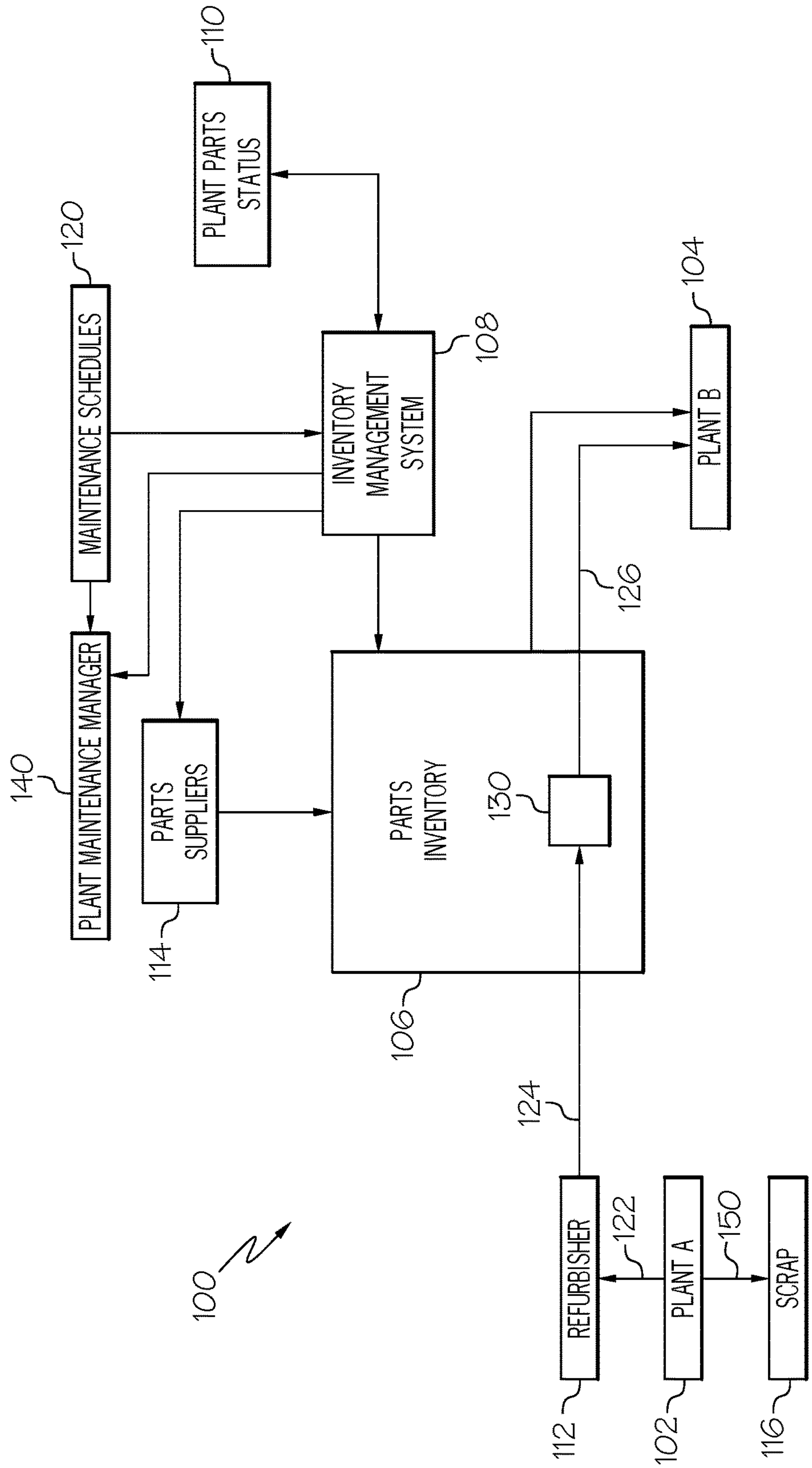
FIG. 1 illustrates a replacement parts inventory and management system, according to an example.

FIG. 1 illustrates a replacement parts inventory and management system 100, according to an example. The replacement parts inventory and management system 100 depicts relevant components of a replacement parts inventory system, components used to manage and process the replacement parts in the replacement parts inventory system, and two examples plants that receive parts from the replacement parts inventory system. In order to simplify the description of relevant aspects of these examples, the following description uses two electrical power generation plants as examples of systems that are supported by a replacement parts inventory and management system 100. It is clear that the principles described herein are able to be applied to scheduling maintenance activities and managing refurbishment and procurement of parts for any number of plants or systems. The plants described below are examples of facilities, systems, installations, or similar equipment for which replacements parts are to be provided for expected maintenance activities that are able to be supported by the systems and methods described below.

As is described in further detail below, a parts inventory 106 stores parts, including replacement wearable components, to be installed into the plants supported by the replacement parts inventory and management system 100. An inventory management system 108 determines whether refurbished parts are able to be available for a particular maintenance activity on a particular plant, or if new parts are to be ordered from parts suppliers 114.

The replacement parts inventory and management system 100 depicts two example plants, a Plant A 102 and a plant B 104. In general, the replacement parts inventory and management system 100 is used to support any number of plants or other systems where each system has one or more parts that are interchangeable with parts used in one or more of the other plants or systems.

The replacement parts inventory and management system 100 includes a parts inventory 106. The parts inventory 106 in an example stores replacement parts that are ready to be installed into the various plants or other facility or systems supported by the replacement parts inventory and management system 100.

The replacement parts inventory and management system 100 depicts parts suppliers 114. In general, a replacement parts inventory and management system 100 will receive new parts from a variety of suppliers. As described below, new parts may be ordered when refurbished parts are not anticipated to be available for an outage or other maintenance operation. In general, the inventory management system 108 is able to store lead times for various new parts to ensure that they are ordered in time to be delivered before scheduled maintenance operations or outages.

In general, the parts inventory 106 is able to include new parts that are obtained from one or more parts suppliers 114, or refurbished parts that are obtained from one or more refurbishers 112. As is described below, the refurbishers 112 obtain worn components that are, for example, removed from an operating plant during maintenance activities and perform refurbishing operations on those parts to make them suitable for reinstallation and reuse in plants that accept those particular parts. In further examples, refurbishers 112 are able to obtain parts from any source and those parts are able to be refurbished and provided to the parts inventory 106.

The replacement parts inventory and management system 100 includes an inventory management system 108. The inventory management system 108 in an example is a computer based management system that maintains records of parts used by each plant, system, or other facility for which replacement parts are to be provided. The inventory management system 108 in various examples maintains records of one or more of: parts in the parts inventory 106; parts that are installed in operating plants or other systems; parts at various locations; other parts; or combinations of these.

The operation of the inventory management system 108 is supported by receiving schedules of maintenance functions for each plant, system or other facility from maintenance schedules 120. The maintenance schedules 120 are determined by various techniques and are able to be based on, for example, the estimated service life of components installed in a particular plant, the amount of time that the particular plant is expected be utilized, other factors, or combinations of these. The maintenance schedules 120 in an example contain definitions of schedules for various types of activities for each system, such as schedules for replacement of wearable components.

The operation of the inventory management system 108 in some examples is also supported by accessing a database of status of parts in operation 110. The status of parts in operation 110 in an example maintains a list of components or parts that are currently installed in each of the plants being maintained by the replacement parts inventory and management system 100. The status of parts in operation 110 also stores indications of how long each part has been installed in its respective plant. In an example, the inventory management system 108 combines information about when each plant is in operation to determine the amount of time each installed part has been in use. For example, the operating time for a particular part is only the time that the plant in which that part is installed was operating. This accounts for time that the particular part is not wearing because the plant in which it is installed is not operating due to, for example, a lack of demand for the output of the plant. A scheduled time to replace each wearable component listed in the status of parts in operation 110 is able to be determined at any particular instance based on both the amount of time the plant in which the part is installed has been operating to date and projections of the amount of time that plant will be operating in the future.

The replacement parts inventory and management system 100 manages the availability of replacement parts to ensure they are available for scheduled plant outages. During a plant outage, a number of maintenance procedures are preformed on the plant including replacement of wearable components that are at or near their time for replacement. Schedules for plant outages are determined based in part on the estimated service life of wearable components and other factors that determine the permissible time between scheduled or routine maintenance activities. In general, the interval between maintenance activities is able to be varied in order to accommodate other scheduling needs. The scheduling of outages for a number of plants is usually coordinated so that outages for different plants are staggered in time and a sufficient number of plants remain operational to meet the requirements of the utility operating those plants.

Various types of outages are able to be scheduled for a particular plant. The type of outage is determined based on the types of maintenance activities that have to be performed at the time of the outage. Part of many scheduled outages is replacement of wearable components. The inventory management system 108, based on maintenance schedules 120 and the status of parts in operation 110 in an example, determines a complete list of parts to be installed into each plant during each outage. The parts to be installed are able to include wearable components and other parts. Based on this determined list of parts, the inventory management system 108 ensures that the parts on this list for a particular plant are available in the parts inventory 106 at the time of the outage of that plant when those parts are to be used. As described in detail below, the replacement parts inventory and management system 100 operates to identify parts that are scheduled to be removed from other plants and that can be refurbished in time for installation in that particular plant during a scheduled outage. In situations when a refurbished part will not be available for installation at the time of an outage of a particular plant, or where a new part would be more cost effective or improve another metric, new parts are able to be ordered from parts suppliers 114 so that they are delivered shortly before the time of the plant outage in which they will be installed.

In an example, the inventory management system 108 is able to define scheduled maintenance actions that are to be performed on the various plants. Examples of scheduled maintenance actions include implementing a plant outage, removing a part from one plant, installing that part after it is refurbished into another plant, or combinations of these.

Some of the wearable components in the plants are able to be refurbished and reused. In some instances, parts that are usually able to be refurbished may reach an "end of life" and can no longer be refurbished. In the illustrated example, end of life parts 150 are sent to scrap 116 for disposal. Further, parts that cannot be refurbished, or that are not economical to refurbish, are also sent to scrap 116. Disposal of parts sent to scrap 116 in various examples may include recycling, processing by investment recovery operations for final disposition, other processing, or combinations of these, but in general end of life parts 150 are removed from processing by the replacement parts inventory and management system 100.

Parts to be refurbished 122 in this example are removed from Plant A 102 and sent to a refurbisher 112. The refurbisher 112 refurbishes the wearable components and sends refurbished wearable components 124 to the parts inventory 106 as a refurbished part 130. A number of refurbished parts 130 are stored in the parts inventory 106 awaiting installation in other plants during their outages. In some instances, a refurbished part 130 is also able to be used in the plant from which it was extracted, such as plant A 102 in this example.

When Plant B 104 has an outage that occurs after the outage of Plant A 102 by an amount of time that is greater than the time required to refurbish at least some of the parts removed from Plant A 102, those removed parts are able to be refurbished, by refurbisher 112, to become a refurbished part 130. The refurbished part 130 is then able to be stored in the parts inventory 106 until it is able to be installed into Plant B 104. Other refurbished parts in the parts inventory 106 at the time of the outage of Plant B 104 are also able to be installed into Plant B during its outage. New parts from parts suppliers 114 are also able to be taken from the parts inventory 106, or directly delivered to Plant B 104, for installation into Plant B 104 during its outage.

Figure 2:
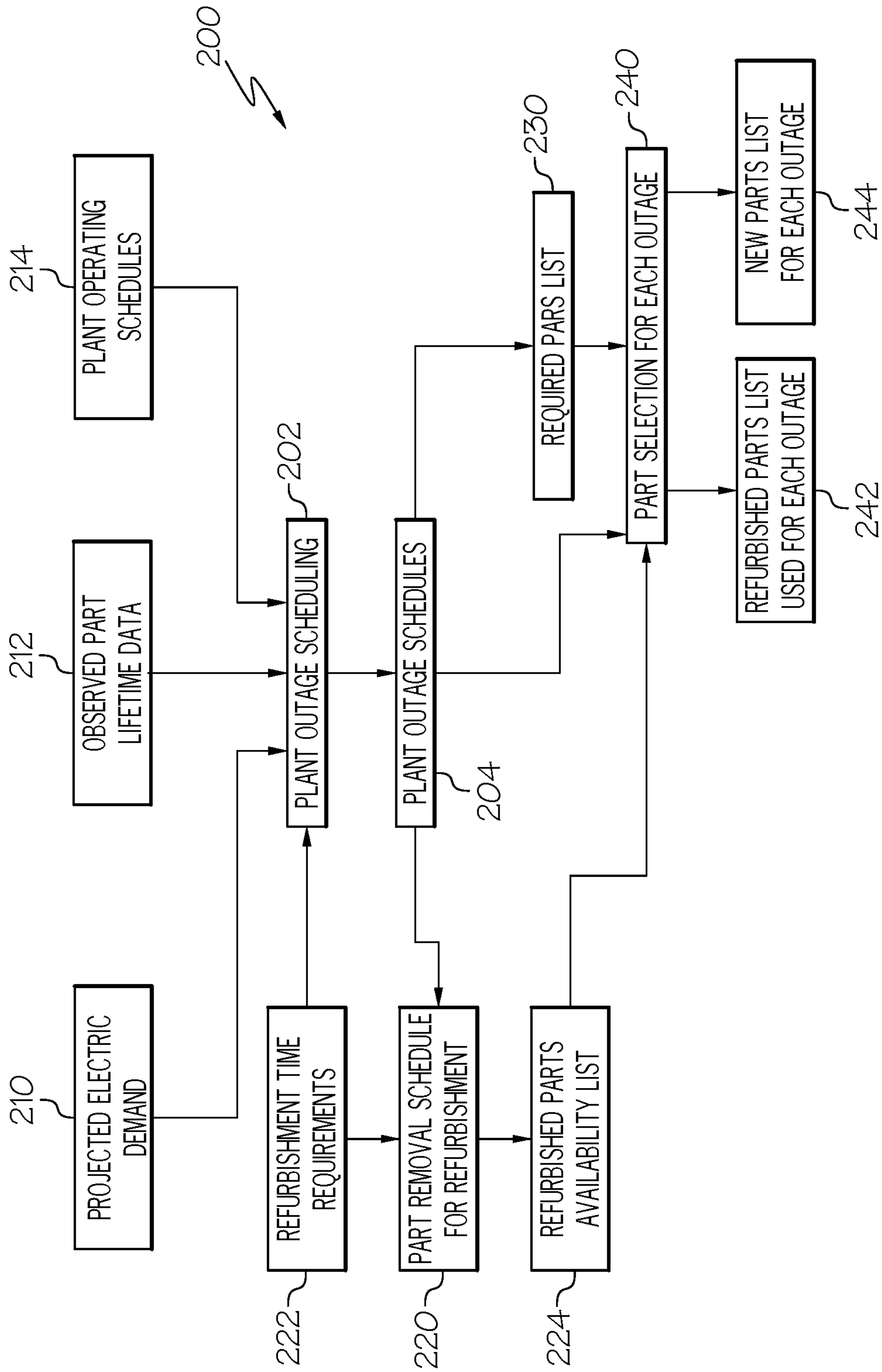
FIG. 2 illustrates a plant outage scheduling data flow, according to an example.

FIG. 2 illustrates a plant outage scheduling process flow 200, according to an example. The plant outage scheduling process flow 200 depicts the sources and exchanges of data and components that are used in an example to determine and adjust outage schedules for various plants of an electric generating utility. The principles illustrated herein are of course applicable to scheduling maintenance activities and managing replacement components for any type of systems or operations. In an example, the plant outage scheduling process flow 200 is performed by the inventory management system 108 described above.

The plant outage scheduling data flow 200 has a plant outage scheduling function 202. The plant outage scheduling function 202 receives data from various sources and produces plant outage schedules 204. The plant outage scheduling function 202 in an example is able to operate iteratively to change outage schedules for related plants in order to, for example, better coordinate the availability of refurbished parts or vary the cost of plant maintenance activities. The plant outage scheduling function 202 is also able to run iteratively or at various times for any other operational considerations, such as ensuring the operation of a number of plants to ensure that the electrical demands for the utility are able to be met. Examples of plant outage schedules are described in further detail below. Although this example describes scheduling of plant outages, similar examples are able to determine schedules for any maintenance activities including maintenance activities that are performed between plant outages.

The plant outage scheduling function 202 receives data indicating the electrical generation requirements for the operator of the multiple electrical plants being maintained from a projected electrical demands database 210. The projected electrical demands database 210 in various examples contains projections of electrical consumption for periods into the future. The scheduling of plant outages in an example is partly based on ensuring that enough plants are operating at the same time to meet the projected electric demands at any time. Storing, updating, otherwise maintaining, or combinations of these, of electrical demands within the projected electrical demands database 210 are examples of determining an estimation of requirements for future operations of the plurality of systems. The inclusion of this data by the plant outage scheduling function 202 is an example of determining a modified time based on meeting those requirements.

An observed part lifetime data storage 212 stores data concerning the previously observed service life of components installed in the plants for which the plant outage schedules are determined. For example, many components, which are referred to as parts in the following description, have an expected service life specified by their manufacturer or other entity based on the design of that part and the system in which it is mounted. The maintenance of operating plants may entail having some parts installed and operating for amounts of time that differ from the expected service life of these parts. The condition of parts that operate for amounts of time that are different than their expected service life is examined are noted in the observed part lifetime data. For example, a particular part may have been installed and operating in a plant for an amount of time longer than the expected service life of that part. In such an example, the condition of the part after operating for longer than it's expected is examined and any impact on refurbishing that part is noted. In an example, if a particular part is observed to be able to operate for longer than its expected service life and excessive wear is not noted, the scheduling may allow to replace that part later than its expected service life would specify. In another example, a part that has been operated beyond its expected service life and is observed to be excessively damaged by the extended use may be marked as having to be replaced closer to the time specified by its expected service life. In an example, the plant outage scheduling function 202 receives these observed part lifetime data and is able to adjust plant outage schedules based on this data.

The plant outage scheduling function 202 receives plant operating schedules 214 in order to schedule future plant outages. In general, a particular plant may not operate all the time and may operate at a reduced level or be taken offline for a number of reasons, such as lower levels of power demand. Wearable components are usually replaced based on the amount of time that the plant in which they are installed is operating. The plant operating schedules 214 includes actual data of the past operations of the plants whose outage schedules are determined by the plant outage scheduling process flow 200, and also projected times that those plants are expected to be operating in the future. The expected future times of operation are based on, for example, projected electric power demands for the utility, other factors, or combinations of these. These projected times are able to be updated with, for example, actual operating times as time progresses, updates to projections of plant operating times based on changes in projected demands, other data, or combinations of these.

Refurbishment time requirements 222 store the time required to refurbish wearable components that are removed from, for example, a plant during a scheduled outage or other maintenance activity. In an example, the refurbishment time requirements includes data from contracts with refurbishing providers that specify the amount of time that is required to refurbish various wearable components. Storing, managing, updating, otherwise maintaining, or combinations of these, of the refurbishment time requirements 222 is an example of maintaining a refurbishment time list that includes a respective length of time to refurbish each component in a number of components that include a worn component to be replaced during a plant outage. The plant outage scheduling function 202 receives this data in determining the amount of time required between an outage of a first plant from which a wearable component will be removed, and an outage of another plant into which that same part, after being refurbished, will be installed. Incorporating the time to refurbish that part, as indicated in the refurbishment time requirements 222, into identification of an identified component that is to be removed from a selected system, refurbished, and installed into a system during an outage by the plant outage scheduling function 202 is an example of basing the identifying of an identified component on the respective length of time within the refurbishment time list to refurbish the identified component.

The plant outage scheduling function 202 determines the plant outage schedules 204 for various plants based on the above described inputs. The plant outage schedules 204 define times during which any plant maintenance is to be performed. Replacement wearable components that are required for each plant outage or maintenance activity are determined based on the definition of the outage or maintenance activity and stored in the required parts list 230. For example, a particular outage may be specified to have a list of identified wearable components removed and replaced. The plant outage scheduling process flow 200 operates to ensure that replacement components are available for each outage or maintenance activity.

Based on the definitions of these scheduled activities, a list of wearable components that are to be removed from plants during a particular outage or maintenance activity is also determined. These removed parts are identified as either being sent for refurbishment or to be scrapped. The decision to refurbish or scrap a particular wearable component removed from a plant is able to be based on any suitable factor, such as the expense of refurbishment relative to the total cost of a new component including considerations such as an extended service life of a new component.

Wearable components that are to be refurbished are identified in a part removal schedule for refurbishment 220. This schedule identifies when wearable components, or parts, are to be removed from a plant during a scheduled outage or maintenance activity. After each of those parts is removed, they are able to be sent to a refurbisher for refurbishment. The refurbishment time requirement 222 defines how long the refurbishment process will take, and thus when the refurbished part will be available for installation into a plant. The schedule of when refurbished parts are available, i.e., after the identified wearable component is removed from the plant and its refurbishment is complete, is stored in the refurbished parts availability list 224.

A parts selection for each outage process 240 determines which parts are to be installed in each plant during each of its scheduled outages. The parts selection for each outage process 240 receives the plant outage schedules and the required parts list 230 for each outage in the plant outage schedules 204. The parts selection for each outage process 240 also receives the refurbished parts availability list 224. Based on comparing the plant outage schedules 204 for each plant with the required parts list 230 and the refurbished parts availability list 224, the parts selection for each outage process 240 determines which refurbished parts will be available from refurbishers to fulfill the items on the required parts list 230 for a particular outage. Once identifying refurbished parts to install during an outage, indicators of those identified available refurbished parts are stored in the refurbished parts list used for each outage 242. If refurbished parts are not available for parts identified on the required parts list 230 for a particular outage, or if a new part would be more cost effective or optimize another metric, new parts are to be ordered and are listed on the new parts list for each outage 244.

Storing, managing, updating, otherwise maintaining, or combinations of these, identifiers of identified refurbished parts into a data storage by the parts selection for each outage process 240 is an example of storing, in association with the identified component, an indication that the identified component is scheduled to be: removed from the selected remote system during the selected remote system maintenance activity; refurbished; and installed into the initial system during the first scheduled maintenance activity. As parts to be removed from other plants are identified for refurbishment and installation into the initial system, these operations by the parts selection for each outage process 240 is also an example of modifying the indication, based on selecting the alternate component or other criteria, to indicate that the alternate component is to be: removed from the alternate remote system during the respective maintenance schedule associated with the alternate remote system; refurbished; and installed into the initial system during the first scheduled maintenance activity at the modified time.

Figure 3:
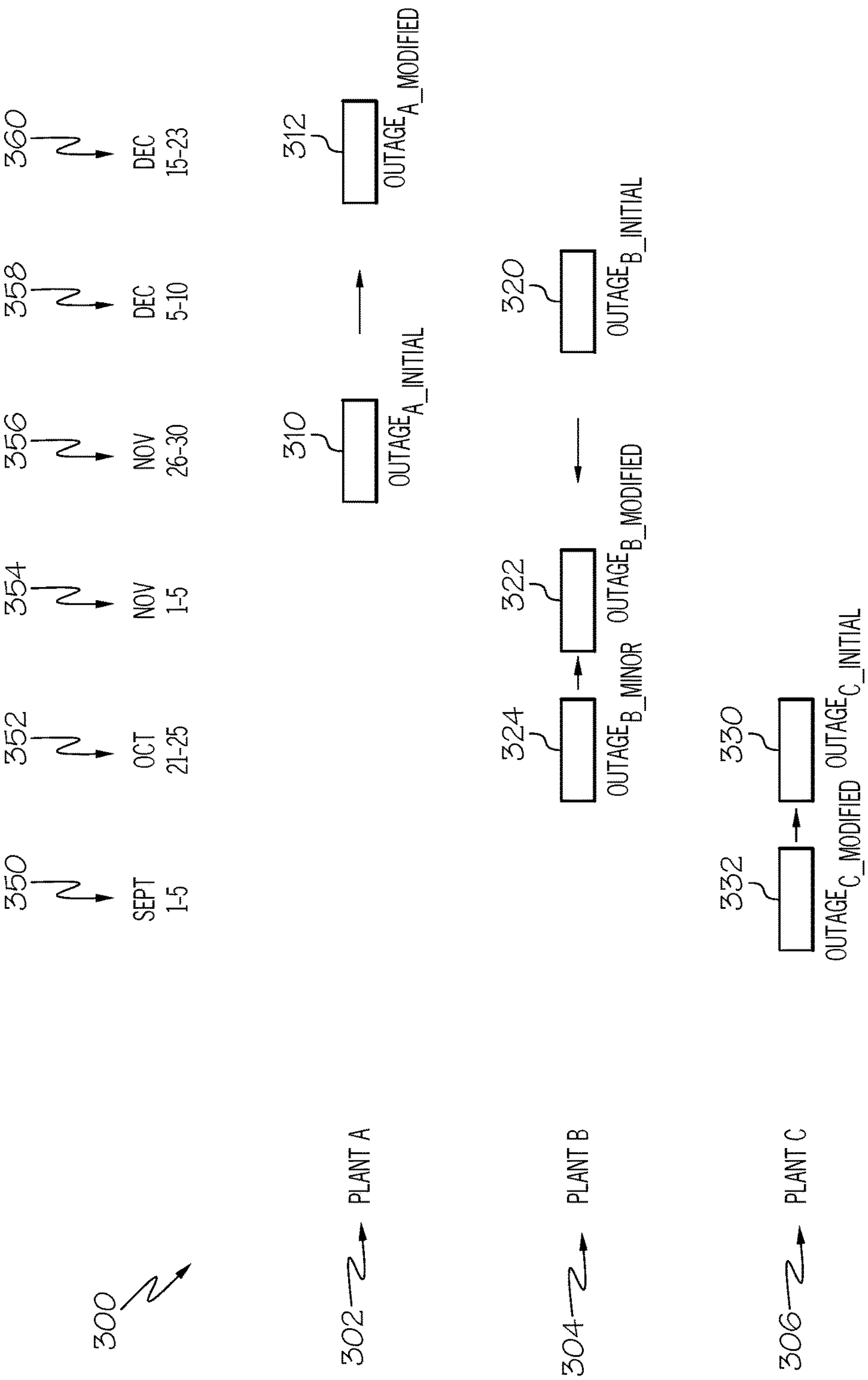
FIG. 3 illustrates a timeline for related plant maintenance outages, according to an example.

FIG. 3 illustrates a timeline for related plant maintenance outages 300, according to an example. The timeline for related plant maintenance outages 300 depicts scheduled outage timelines for three power plants. A plant A outage schedule 302 shows outage schedules for Plant A. A plant B outage schedule 304 shows outage schedules for Plant B. A plant C outage schedule 306 shows outage schedules for Plant C. These plants are considered for purposes of this example to be related because they have one or more wearable components that are interchangeable between these plants, such as by being the same part, and a worn component can be removed from one of these plants, refurbished, and installed into another of these related plants. As is described below, these timelines depict initial schedules for outages of the respective plants in which maintenance activities will occur, along with adjustments made to those schedules for each plant outage. In an example, plant outage schedules are adjusted in order to improve the availability and reusability of refurbished parts that are removed from one plant for use in another plant.

The timeline for related plant maintenance outages 300 illustrates an example of a number of respective maintenance schedules that are maintained for a number systems, such as the plants described above. In this illustration, Plant A is an example of an initial system from which a worn component is identified. In this description, the term worn component refers to any one or more parts, components, pieces, manufactures, other items, or combinations of these, that are scheduled to be replaced within a system. In an example, a worn component is not worn at the time it is identified, but is scheduled to be replace as a worn out component at some time in the future. In this example, a worn component is identified to be replaced during the outage depicted for Plant A within the plant A outage schedule 302.

In the timeline for related plant maintenance outages 300, Plant B and Plant C are examples of remote systems that include compatible components for the identified worn component that is to be removed from Plant A during an outage within plant A outage schedule 302. In this discussion, a compatible component is any component that is able to replace the identified worn component. In some examples, a compatible component is able to be one or more of: the same part model, such as one having the same manufacturer and part number, as the worn component; a compatible part model able to serve as a substitute for the worn component; a part that is able to be modified or altered to suitable substitute for the worn component, a combination of parts or components that are able to replace the worn component; similar items, or combinations of these. In some examples, compatible components are able to be a worn component installed in another system were that worn component is removed from that other systems, refurbished, and able to be installed into the initial system after its refurbishment is complete.

The timeline for related plant maintenance outages 300 depicts several time durations between September 1$^{st}$ and December 23$^{rd}$ that correspond to times during which plant outages are scheduled. In this illustrated example, several five (5) day durations are shown that indicate plant outages that are scheduled to last for five days each. The timeline for related plant maintenance outages 300 includes a first time duration 350, a second time duration 352, a third time duration 354, a fourth time duration 356, and a fifth time duration 358. Such outages that last for a constant number of days may indicate, for example, that the outages are of a similar type and similar maintenance activities are to be performed during those outages. A sixth time duration 360 is for nine (9) days and indicates a different type of outage is performed during that time duration.

The plant A outage schedule 302 depicts an outage$_{A_initial}$ 310 which is an initially scheduled outage for Plant A. The outage$_{A_Initial}$ 310 is shown to be scheduled to occur during the fourth time duration 356 from November 26$^{th}$ to 30$^{th}$. The plant B outage schedule 304 depicts an outage$_{B_initial}$ 320 and also an outage$_{B_minor}$ 324 which are both initially scheduled outages for Plant B in this example. The outage$_{B_initial}$ 320 is shown to be scheduled to occur during the fifth time duration 358 from December 5$^{th}$ to 10$^{th}$. The plant C outage schedule 306 depicts an outage$_{C_initial}$ 330 which is an initially scheduled outage for Plant C. The outage$_{C_initial}$ 330 is shown to be scheduled to occur during the second time duration 352 from October 21$^{st}$ to 25$^{th}$.

The timeline for related plant maintenance outages 300 depicts adjustments to the initially scheduled plant maintenance outages in order to, for example, change a metric associated with operating these plants. For example, the scheduled times for maintenance related closing of the different plants are able to be adjusted in order to increase an ability to refurbish parts that are scheduled to be removed from one plant in time to be ready for installation into another plant.

The timeline for related plant maintenance outages 300 depicts adjustments to the times of the originally scheduled plant outages. An example of the considerations upon which these adjustments are based is described below with regards to FIGS. 5-7. In this example, the start of the scheduled outages of these plants are adjusted to allow identified parts that are scheduled to be removed from plants B and C to be refurbished in time for installation into plant A during its re-scheduled outage. In the plant outage schedule adjustments illustrated for the timeline for related plant maintenance outages 300, the initially scheduled outages for plants B and C are moved to be earlier than initially scheduled, and the initially scheduled outage for plant A is moved to be later.

In particular, the outage$_{A_initial}$ 310 is changed to an outage$_{A_modified}$ 312 which is shown to be scheduled to occur during the sixth time duration 360 from December 15$^{th}$ to 23$^{rd}$. Because this outage is moved to be later, there is more time to refurbish parts removed from other plants in time for this re-scheduled outage In adjusting the scheduled outage for plant A, the type of outage in this example was also changed. The outage$_{A_modified}$ 312 is a type of outage that lasts for nine (9) days and includes more maintenance activities than the outage$_{A_initial}$ 310 outage. In general, adjusting outage schedules allows not only the time of the outage to be changed, but also the type of outage that is to be performed. As is described below, adjusting outage schedules may also allow two or more initially scheduled outages to be combined into one outage. In some examples one outage may also be split into multiple outages or any combination of outage rearrangements may be made in order to improve a targeted metric such as increasing the number of refurbished parts that are used with reduced shelf time between the time they are finished being refurbished and installed into a plant.

In the timeline for related plant maintenance outages 300, Plant A is an example of an initial system where the plant A outage schedule 302 is an example of a respective maintenance schedule for the initial system. In this example, an identified worn component is scheduled to be replaced during the outage$_{A_initial}$ 310, which is an example of a first scheduled maintenance activity of the respective maintenance schedule for the initial system. The timeline for related plant maintenance outages 300 further depicts that the outage$_{A_initial}$ 310 of the plant A outage schedule 302 was modified to occur at the outage$_{A_modified}$ 312. As described below, this modification allows refurbished parts from other plants, which are examples of remote systems, to be refurbished in time to be installed into Plant A during the outage$_{A_modified}$ 312.

The processing to adjust outage schedules for these related plants determined to combine the outage$_{B_initial}$ 320 and the outage$_{B_minor}$ 324 into an outage$_{B_modified}$ 322. In this example, the activities of the an outage$_{B_initial}$ 320 and also an outage$_{B_minor}$ 324 can both be performed during the five (5) days scheduled for the outage$_{B_modified}$ 322, which is scheduled to occur during November 1$^{st}$ through 5$^{th}$. These two outages were determined to be combined due to an evaluation of the costs of combining the activities of each outage indicating that combining these outages would lower overall associated costs. The processing to adjust outage schedules for these related plants also determined to adjust the outage$_{C_initial}$ 330 by moving its time to an outage$_{C_modified}$ 332 that occurs earlier in time, on September 1$^{st}$ through 5$^{th}$. As described below, these adjustments to these outages allows parts removed from Plant B and Plant C to be refurbished in time for installation into Plant A during its modified scheduled outage time outage$_{A_modified}$ 312.

Figure 4:
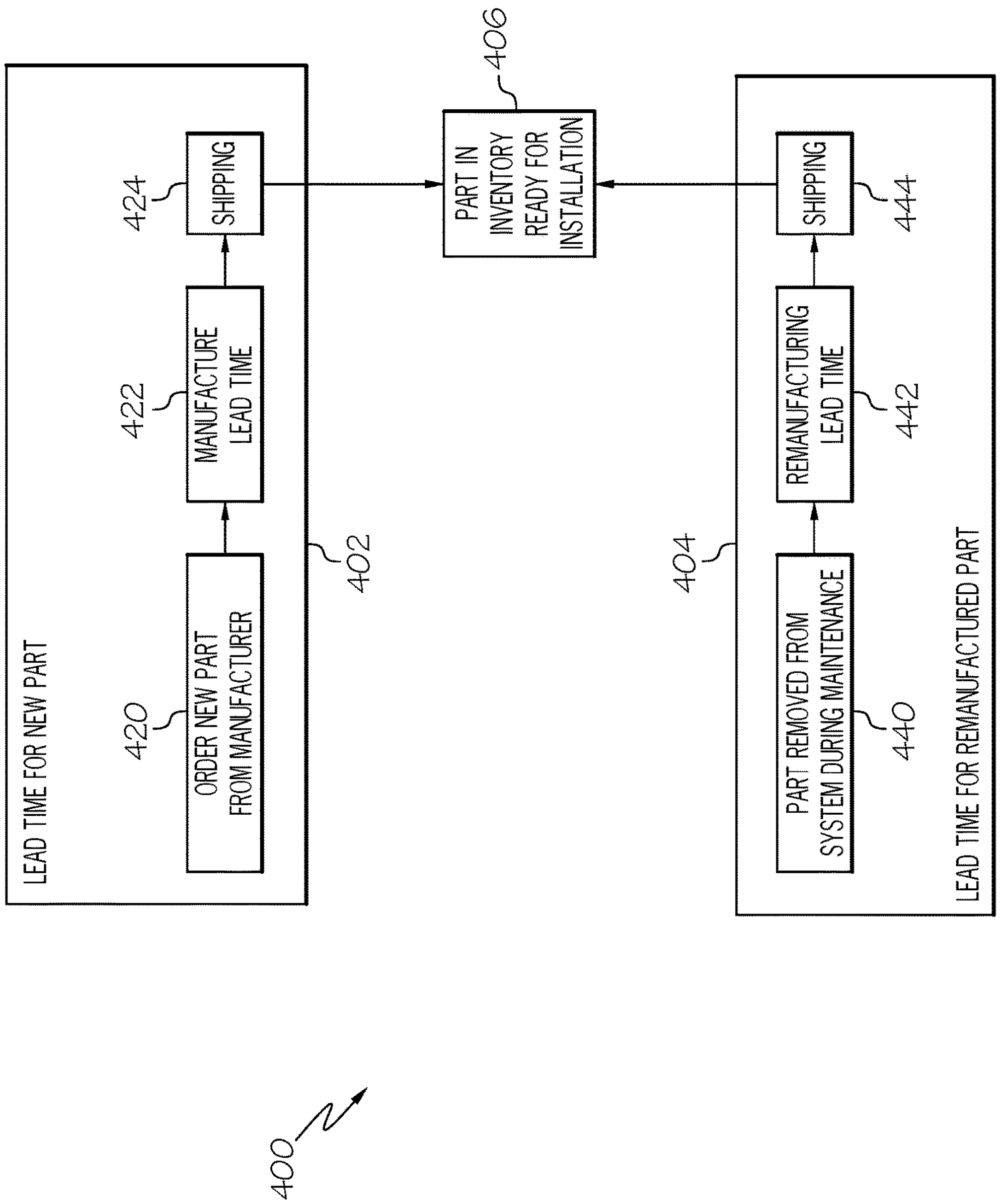
FIG. 4 illustrates a parts order or refurbish timeline, according to an example.

FIG. 4 illustrates a parts order or refurbish timeline 400, according to an example. The parts order or refurbish timeline 400 illustrates the time relationships and durations of various activities associated with obtaining parts to be installed in a plant during a scheduled outage.

The parts order or refurbish timeline 400 illustrates two paths by which a particular part is able to be obtained for installation into a plant. A new part procurement path 402 illustrates lead times for new parts and a refurbished part path 404 illustrates lead times for new parts. The new part procurement path 402 depicts times and durations of events associated with obtaining a new part from parts suppliers 114 discussed above. The refurbished part path 404 depicts times and durations of events associated with removing a part from a plant and refurbishing that part to allow the refurbished part to be reused and installed into a plant. After either of these paths, a new part or a refurbished part is placed in inventory to be ready for installation 406. In general, an input into the parts order or refurbish timeline is the date by which the part, whether new or refurbished, is to be ready for installation. In an example, given the date of the event that the part is to be in inventory ready for installation 406, the time at which a part is to be ordered from a manufacturer, or removed from a plant for refurbishment, is determined based on the time durations of either the new part procurement path 402 or the refurbished part path 404, respectively.

The new part procurement path 402 depicts a process to order a new part from a manufacturer. The new part procurement path 402 includes ordering a new part from manufacturer 420. After the part is ordered, there is a manufacture lead time 422. In an example, the value of the manufacture lead time 422 is provided by the manufacturer for each part that the manufacturer provides. After the manufacturing lead time 422, a shipping time duration 424 determines how long it takes to part to be shipped from the manufacturer to the inventory of the plant operator. The shipping time duration 424 for a particular part is able to be determined based on information provided by shipping companies and locations of a manufacture, or the manufacturer's intermediate handling facilities such as distributors, for that part. After the shipping time duration 424, the part is in the inventory ready for installation 406.

The refurbished part path 404 depicts a process to refurbish a part extracted from a plant in order to prepare that part for reuse. The refurbished part path 404 includes removing the part from the system during maintenance 440. Once the part is removed, it is sent to a refurbisher. The refurbisher will specify a remanufacturing lead time 442 for each part. After this remanufacturing lead time, a shipping time duration 444 determines how long it takes to part to be shipped from the refurbisher to the inventory of the plant operator. The shipping time duration 444 for a particular part is able to be determined based on information provided by shipping companies and locations of the refurbisher for that part. After the shipping time duration 444, the part is in the inventory ready for installation 406.

In various examples, a decision to use a new part or a refurbished part is based on various factors, such as the relative costs, lead times, other factors, or combinations of these, for the new and refurbished parts. In an example, a determination is made as to whether a refurbished part or a new part is to be selected for installation into a system or plant based on evaluations of these factors.

FIGS. 5-7 illustrate data identifying particular parts that are used in three plants along with refurbishment information for parts in some plants. These three figures depict wearable components, including their serial numbers, that are installed in the operating plants whose outage schedules are described above in the timeline for related plant maintenance outages 300. The depicted parts are scheduled to be removed during an upcoming outage. Data indicating the availability of parts in two plants that can be refurbished and ready in time to be installed in the first plant during an upcoming outage is also depicted.

FIG. 5 illustrates a plant A parts removal list 500, according to an example. The plant A parts removal list 500 depicts three parts installed in a plant A. In this example, these three parts are scheduled to be removed and replaced during the outage scheduled for Plant A, i.e., during one of the scheduled outages shown in the plant A outage schedule 302 described above. These removed parts will be replaced with new or refurbished parts during the maintenance activity. The plant A parts removal list 500 is an example of a required parts list 230 discussed above for a particular outage of a particular plant.

The plant A parts removal list 500 includes three rows that each has one part. Each row in this illustration has a part type identifier column 502 and a part serial number column 504. The part type identifier 502 indicates the type of part or category of part. In general, a part type identifier may indicate a specific part or a class of parts that are interchangeable. The part serial number column 504 contains a unique identifier for the particular installed part of that part type. In further examples, a parts removal list is able to have any number of columns that contain any information associated with the parts to be removed.

A first row 510 has a part type of Part N that has serial number 123. A second row 512 has a part type of Part M that has serial number 24. A third row 514 has a part type of Part Z that has serial number 5. The parts and their particular identification, such as their serial number, are maintained in the course of maintaining these plants. These parts will be removed from plant A during its scheduled outage and are able to be refurbished for installation into plants that are able to use this part.

FIG. 6 illustrates a plant B parts removal list 600, according to an example. The plant B parts removal list 600 depicts five parts installed in a plant B that are scheduled to be removed and replaced during the an outage of plant B, such as is depicted as the plant B outage schedule 304 described above. The plant B parts removal list 600 is an example of a required parts list 230 discussed above for a particular outage of a particular plant. The parts on this list will be removed and can be refurbished for use in plants that can accept these parts. Plant B will also have new or refurbished parts installed to replace these parts during this scheduled outage.

The plant B parts removal list 600 includes a part type identifier column 602 and a part serial number column 604 that are similar to the corresponding columns in the plant A parts removal list 500 described above. The plant B parts removal list 600 also has a time to refurbish column 606 and a candidate for plant A outage column 608. The time to refurbish column 606 lists the time it takes to refurbish a part once it is removed from a plant. The time to refurbish column 606 contains information for the particular part in its respective column from the refurbishment time requirement 222 described above.

The candidate for plant A outage column 608 is used by processing to determine candidate parts to be installed into plant A during its scheduled outage. The candidate for plant A outage column 608 in this example indicates whether that particular part, which will be removed from plant B during the scheduled outage described above, will be able to be refurbished in time to be installed into plant A during its scheduled outage. In this example, the plant B parts removal list 600 is based on the outage for plant B being scheduled at the outage$_{b_modified}$ 322 as described above. This outage$_{b_modified}$ 322 is scheduled to occur during the third time duration 354 that includes November 1-5. The candidate for plant A outage column 608 is based on the modified outage schedule outage$_{a_modified}$ 312 that occurs during the sixth time duration 360.

A first row 610 has a part type of Part N that has serial number 556. The time to refurbish column 606 for the first row indicates that this part has a refurbishment time of 2 months. The time to refurbish this part is based on, for example, time commitments made by refurbishers to refurbish this particular type of part. Based on the scheduled time of the outage for plant B during which this part will be removed and the time to refurbish this part, this particular part will not complete its refurbishment until January. Therefore, this refurbished part will not be available for the scheduled plant A outage in December. Because this part will not be refurbished and ready for installation at the time of the outage$_{a_modified}$ 312, the candidate for plant outage A column 608 indicates that this particular part will not be ready for that outage.

A second row 612 has a part type of Part M that has serial number 18. The time to refurbish column 606 for the first row indicates that this part has a refurbishment time of 1 month. Based on the scheduled time of the outage for plant B during which this part will be removed and the time to refurbish this part, this particular part will complete its refurbishment by December 5th. Therefore, this refurbished part will be available for the scheduled plant A outage that is scheduled for December 15-23. Because this part will be refurbished and ready for installation at the time of the outage$_{a_modified}$ 312, the candidate for plant outage A column 608 indicates that this particular part will be ready for that outage.

FIG. 7 illustrates a plant C parts removal list 700, according to an example. The plant C parts removal list 700 depicts three parts installed in a plant C that are scheduled to be removed during the an outage of plant C, such as is depicted as the plant C outage 206 described above. As with the plant B parts removal list 600 discussed above, the plant C parts removal list 700 is an example of a required parts list 230 and lists parts to be removed and that can be refurbished for use in plants that can accept these parts. Plant C will also have new or refurbished parts installed to replace these parts during this scheduled outage.

As with the plant B parts removal list 600 discussed above, the plant C parts removal list 700 includes a part type identifier column 702, a part serial number column 704, a time to refurbish column 706 and a candidate for plant A outage column 708. These columns contain information similar to that of the corresponding columns of the plant B parts removal list 600.

The candidate for plant A outage column 708 is also used by processing to determine candidate parts to be installed into plant A during its scheduled outage and indicates whether that particular part will be able to be refurbished in time to be installed into plant A during its scheduled outage. In this example, the plant C parts removal list 700 is based on the outage for plant C being scheduled at the outage$_{c_modified}$ 332 as described above, which is scheduled to occur during the first time duration 350 that includes September 1-5. The candidate for plant A outage column 708 is based on the modified outage schedule outage$_{a_modified}$ 312 that occurs during the sixth time duration 360.

A first row 710 has a part type of Part N that has serial number 690. The time to refurbish column 606 for the first row indicates that this part has a refurbishment time of 2 months. Based on the scheduled time of the outage for plant C during which this part will be removed and the time to refurbish this part, this particular part will complete its refurbishment by the schedule outage$_{a_modified}$ 312. Therefore, this refurbished part will be available for the scheduled plant A outage in December and the candidate for plant outage A column 608 indicates that this particular part will be ready for that outage.

A second row 712 has a part type of Part M that has serial number 40. The time to refurbish column 706 for the first row indicates that this part has a refurbishment time of 1 month. Based on the scheduled time of the outage for plant C during which this part will be removed and the time to refurbish this part, this particular part will complete its refurbishment by October 5th. Therefore, this refurbished part will be available for the scheduled plant A outage that is scheduled for December 15-23 and the candidate for plant outage A column 608 indicates that this particular part will be ready for that outage.

A third row 714 has a part type of Part Z that has serial number 18. The time to refurbish column 706 for the first row indicates that this part has a refurbishment time of 3 months. Based on the scheduled time of the outage for plant C during which this part will be removed and the time to refurbish this part, this particular part will complete its refurbishment by December 15th. Therefore, this refurbished part will be available for the scheduled plant A outage that is scheduled for December 15-23 and the candidate for plant outage A column 608 indicates that this particular part will be ready for that outage.

The above combination of the timeline for related plant maintenance outages 300 and the parts removal lists 500-700 depicts data that is used to modify outage schedules in order to allow refurbished parts from one plant to be available an outage in another plant. In particular, the original outages planned for plants A, B, and C, as depicted with outage$_{a_initial}$ 310, outage$_{b_initial}$ 320, and outage$_{c_initial}$ 330. The plant B parts removal list 600 and plant C parts removal list 700, include data indicating how long the refurbishment of each of these parts will take after they are removed. Due to the time to refurbish these parts, some of the parts removed from the illustrated scheduled outages of plants B and C are not able to be available for use in the illustrated scheduled outage of plant A. Processing described below is able to be performed to modify the schedule of outages, as is depicted above in the timeline for related plant maintenance outages 300, so that more parts that are removed from plants B and C will be able to be refurbished in time for installation during an outage of plant A.

The modification of outage schedules is able to include delaying an outage of a plant that is to receive a refurbished part, moving an outage to an earlier scheduled time for a plant that is to have a part removed and refurbished for installation, or combinations of these. In modifying outage schedules, the type of outage is able to be modified so as to alter the maintenance tasks to be performed during the outage. In general, delaying a plant outage can impact the operating costs of the plant. Examples of cost impacts due to delaying an outage include increased costs associated with operating parts of the plant beyond their expected service life, costs due to a plant operating less efficiently due to delayed maintenance, other costs increases, or combinations of these. Delaying an outage may also cause cost reductions, such as amortizing costs of parts over a longer operating time, allowing refurbished parts to be available at the later outage time, other costs reductions, or combinations of these.

As shown in the plant B parts removal list 600 and plant C parts removal list 700, the modified outage schedules result in the ability for a refurbished Part M from either plant B or Plant C to be available for the rescheduled outage$_{A_modified}$ 312. The selection of which particular Part M will be identified and earmarked for refurbishment and installation into Plant A during the rescheduled outage$_{A_modified}$ 312 is able to be made based on any suitable criteria, including, for example, requirements for Part M in other maintenance activities scheduled for other plants.

Figure 8:
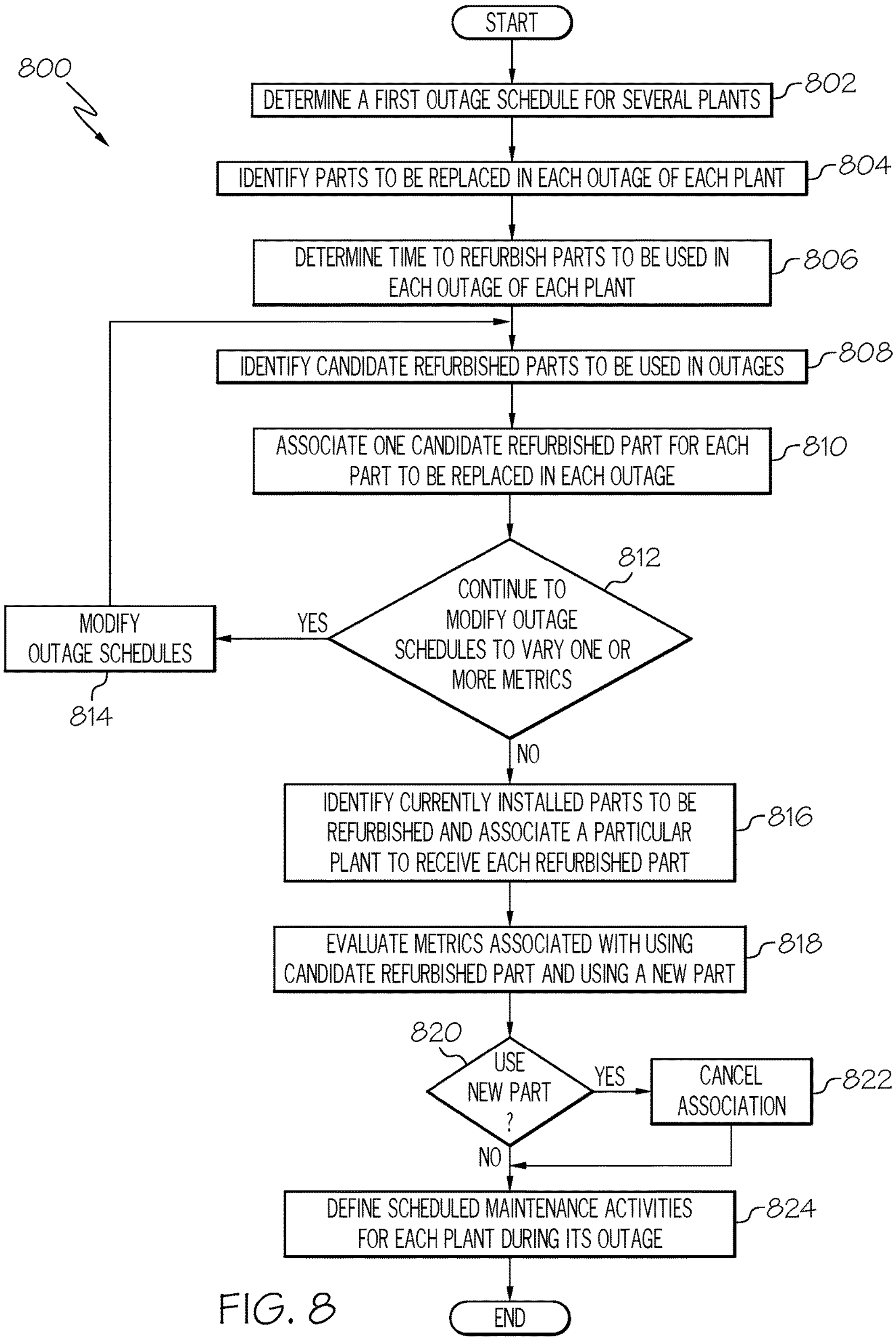
FIG. 8 illustrates a multiple plant outage scheduling process, according to an example.

FIG. 8 illustrates a multiple plant outage scheduling process 800, according to an example. The multiple plant outage scheduling process 800 depicts an example of a method of managing operational system component replacement that includes an iterative process to determine and adjust schedules for plant outages. The multiple plant outage scheduling process 800 is able to iterate to improve or optimize any metric, such as total cost for operating all of the multiple plants for which outage are being scheduled.

The multiple plant outage scheduling process 800 begins by determining, at 802, a first outage schedule for several plants. In general, the multiple plant outage scheduling process 800 is able to schedule outages for any number of plants. In some examples, this first outage schedule is able to be an initial schedule generated at the start of this process based on various factors such as prior maintenance in combination with past and projected plant utilization. In other examples, this first outage schedule is able to be an existing outage schedule generated by any technique and provided to this process. Examples of first outage schedules for several plants include the above described outage$_{A_initial}$ 310, outage$_{B_initial}$ 320, outage$_{B_minor}$ 324, and outage$_{C_initial}$ 330. Determining the first outage schedule for several plants is an example of maintaining a respective maintenance schedule of respective maintenance activities that are associated with each system within a plurality of systems, the plurality of systems comprising an initial system and a plurality of remote systems that are each different from the initial system.

The multiple plant outage scheduling process 800 identifies, at 804, parts to be replaced in each outage of each plant. In an example, these identified parts are wearable components that are listed on the required list 230 described above. The parts to be replaced are identified in an example based on the activities scheduled to be performed for the outage. The identification of parts to be replaced in each outage, at 804, are examples of identifying: a worn component within the initial system to be replaced during a first scheduled maintenance activity in the respective maintenance schedule for the initial system.

In an example, the time required to refurbished the above identified parts to be replaced in each outage is determined, at 806. In general, a time to refurbish a particular part is determined based on known factors such at the time a refurbisher states is needed to refurbish that part. These times are determined for parts that are able to be refurbished and are used to determine times when parts currently installed within a plant are to be removed from that plant in order to be refurbished in time for installation in a plant as a refurbished part.

Candidate refurbished parts to be used in each outage are identified, at 808. These parts are identified based upon the scheduled time of an outage in which the part is to be installed into a plant, the time to refurbish that part, and the time that the part is to be removed from a plant in order to be refurbished. Identification of such candidate refurbished parts, at 808, are examples of: identifying an identified component scheduled to be removed from a selected remote system during a selected remote system maintenance activity; or selecting an alternate component scheduled to be removed from an alternate remote system during a respective maintenance activity associated with the alternate remote system. In such an example, the identified component is a compatible component able to replace the worn component, the identified component being able to be refurbished after removal from the selected remote system in time for the first scheduled maintenance activity.

One candidate refurbished part is associated with each part to be replaced in each outage, at 810. These candidate refurbished parts are based on the above identification of candidate parts. This association is able to select one of several candidate parts that may be available in time for a particular outage in order to, for example, effectively provide the a refurbished part of the same part type for another outage. This associating of one candidate refurbished part with each part to be replaced in an outage is an example of storing, in association with the identified component, an indication that the identified component is scheduled to be: removed from the selected remote system during the selected remote system maintenance activity; refurbished; and installed into the initial system during the first scheduled maintenance activity A determination is made, at 812, as to whether the multiple plant outage scheduling process 800 is to continue to adjust outage schedules to vary one or more metrics. This varying of metrics is able to include, but is not limited to, increasing the timely availability of more refurbished parts for the multiple scheduled outages, decreasing the total cost of replacing and operating the several plants for which outages are being scheduled, other metrics, or combinations of these. The determination to continue this iterating is able to be based on, for example, achieving a desired value in one or more metrics, performing several iterations without appreciable improvement in one or more desired metrics, other factors, or combinations of these.

If the multiple plant outage scheduling process 800 is to continue iterating, the outage schedules are adjusted, at 814. In an example, various factors, such as the scheduled time for particular outages, are able to be varied based on allowable variations in the service life of parts to be replaced in the outage. The multiple plant outage scheduling process 800 then returns to identifying, at 808, candidate refurbished parts to be used in outages, as is described above.

Adjusting outage schedules, such as at 814, is an example of determining at least one respective modified time for each respective remote system maintenance activity that is associated with a respective remote system within the plurality of remote systems, or determining a modified time for an alternate remote system maintenance. In such an example, the respective alternate component is a compatible component for the worn component and each respective modified time is a time different from a time at which its associated respective remote system maintenance activity is scheduled in the respective maintenance schedule of the respective remote system.

Adjusting outage schedules is also an example of determining a modified time for an alternate remote system maintenance activity within a respective maintenance schedule that is associated with an alternate remote system in which an alternate component is to be removed from the alternate remote system, the alternate component being a compatible component for the worn component, the modified time being a time different from a time of the alternate remote system maintenance activity that is scheduled in the respective maintenance schedule associated with the alternate remote system. Adjusting outage schedules is also an example of determining a modified time for the first scheduled maintenance activity associated with the initial system.

After the outage schedules are adjusted, the iterations of identifying candidate refurbished parts to be used in outages, and associating one candidate refurbished part for each part to be replaced in each outage are examples of, respectively, selecting, based on each respective remote system maintenance activity occurring at one of its respective modified time, either: the identified component, or an alternate component scheduled to be removed from an alternate remote system within the plurality of remote systems during a respective remote system activity associated with the alternate remote system where that respective remote system activity occurs at the one of its respective modified time. This identification and association, when iteratively performed, are also examples of modifying the indication, based on selecting the alternate component, to indicate that the alternate component is to be: removed from the alternate remote system during the respective remote system maintenance activity occurring at the one of its respective modified times; refurbished; and installed into the initial system during the first scheduled maintenance activity.

If the multiple plant outage scheduling process 800 is to not continue iterating, currently installed parts to be refurbished for each outage are identified and associated, at 816, with a particular plant that is to receive that part once refurbished. These associations identify particular parts to be refurbished and installed into the particular plant.

In an example, a further evaluation is made to determine if a new part is to be used instead of the above identified and associated part to be refurbished. In some examples, a new part is able to be selected for installation during an outage if using a new part will improve one or more metrics associated with operating all of the several plants. For example, modifying outage schedules in the manner determined by the above described processing may increase operating costs, impact other metrics, or both to an extent that using a new part is more effective.

In an example, metrics associated with using the candidate refurbished part and alternatively using a new part are evaluated, at 818. A determination is made, at 822, if a new part is to be used. This determination in an example is based on the values of metrics associated with each alternative. This determination is an example of selecting, based on a value of a metric resulting from selecting the identified component, either the identified component, or a new component.

If a new part is determined to be used, the association described above, at 816, is cancelled, and a new part is defined to be installed during the outage of the particular plant. In an example, cancelling this associating includes cancelling the above described identification of the candidate refurbished part.

In an example, scheduled maintenance activities for each plant during its outage are defined, at 824. Defining these scheduled maintenance activities in an example includes interacting with the above described plant maintenance manager 140. Defining these scheduled maintenance activities causes the plant outage to occur and further causes the identified parts to be installed or removed from the respective plant during that scheduled maintenance activity. In an example, defining scheduled maintenance activities for each plant includes defining a remote system scheduled maintenance action within a maintenance manager for the alternate remote system and defining a first scheduled maintenance action within the maintenance manager. In an example, the remote system scheduled maintenance action includes ordering the alternate component to be removed from the alternate remote system and the first scheduled maintenance action includes ordering the alternate component to be installed after it is refurbished into the initial system during the first scheduled maintenance activity. The multiple plant outage scheduling process 800 then ends.

Figure 9:
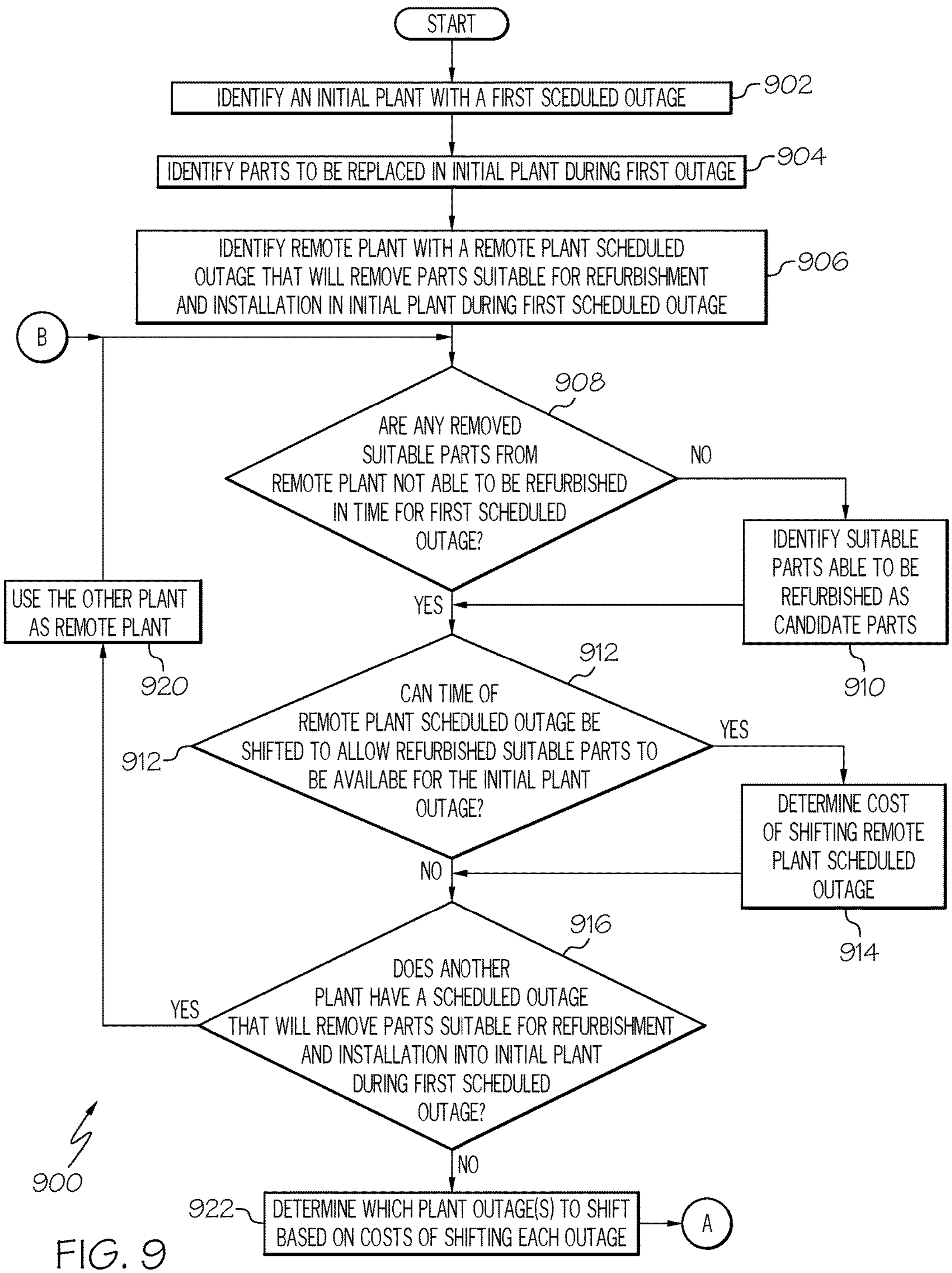
FIG. 9 illustrates an outage schedule modification process, according to an example.

FIG. 9 illustrates an outage schedule modification process 900, according to an example. At least a portion of the outage schedule modification process 900 is able to be performed as part of the modify outage schedules 814 described above. In general, an initial schedule of plant outages is provided to the outage schedule modification process 900. This initial schedule is able to be determined by any technique. Once this initial schedule is provided, the outage schedule modification process 900 modifies the scheduled outages to improve a targeted metric.

The outage schedule modification process 900 begins by identifying, at 902, an initial plant with a first scheduled outage. This identification is able to be based on any suitable criteria, such as a random selection of an outage at a plant within all of the plants on the initial schedule, selection of an outage that occurs in certain time ranges, any other criteria, or combinations of these, can be used to identify the first scheduled outage.

Plant A in the above described timeline for related plant maintenance outages 300 is an example of an initial plant with an example of a first scheduled outage as $\text{outage}_{A\_original}$ 310.

Parts to be replaced in the initial plant during the first scheduled outage are identified, at 904. As is described above, parts to be replaced during a particular outage are able to be determined based on the type of outage scheduled, the service history of parts in that particular plant, other factors, or combinations of these.

A remote plant that has a currently scheduled outage at a remote plant scheduled outage time is identified, at 906, where parts will be removed from the remote plant during the remote plant outage time that are suitable for refurbishment and installation in the initial plant during the first scheduled outage. Plant B and Plant C in the above described timeline of related plant maintenance outages 300 are examples of such remote plants.

A determination is made, at 908, as to whether any removed suitable parts from the remote plant are not able to be refurbished in time for the first scheduled outage. If this determination is not true, suitable parts able to be refurbished as candidate parts are identified, at 910. Identifying such candidate parts allows those particular parts to be earmarked for installation into the initial plant during the first scheduled outage because they will be refurbished in time after being removed from this remote plant during the remote plant scheduled outage.

If the determination above, at 908, is true, a determination is made, at 912, as to whether the time of the remote plant schedule outage can be shifted to allow refurbished suitable parts to be available for the initial plant outage. If such a shift is possible, the cost of shifting the remote plant scheduled outage so as to allow the refurbished parts to be available is determined, at 914. Determining the cost of shifting the remote plant scheduled outage is an example of determining a first value of a metric resulting from selecting the identified component (from the initial plant) and determining a second value of a metric resulting from the combination of selecting the alternate component (from the remote plant) and modifying to occurrence by the modified time. In an example, these value metrics correspond to the total cost of maintaining all of the systems that are affected by the shifting plant outages.

A determination is then made, at 916, as to whether another plant has a scheduled outage that will remove parts suitable for refurbishment and installation into the initial plate during the first scheduled outage. If such a plant exists, that plant is set as the remote plant, at 920. If such a plant does not exists, a determination is made, at 922, of which plant outage(s) to shift based on the cost of shifting each outage of each plant. Determining which plant outage to shift is able to be based on any suitable criteria, such as which shift or change in the plant outage will result in lowest overall costs. The outage schedule modification process 900 then continues, though connector "A" of FIG. 9, to an initial plant outage adjustment process 1000, as is described below. The determination of which plant outage to shift is an example of selecting either the identified part from the initial plant or an alternate part from a remote plant based at least in part on a difference between the first value and the second value.

Figure 10:
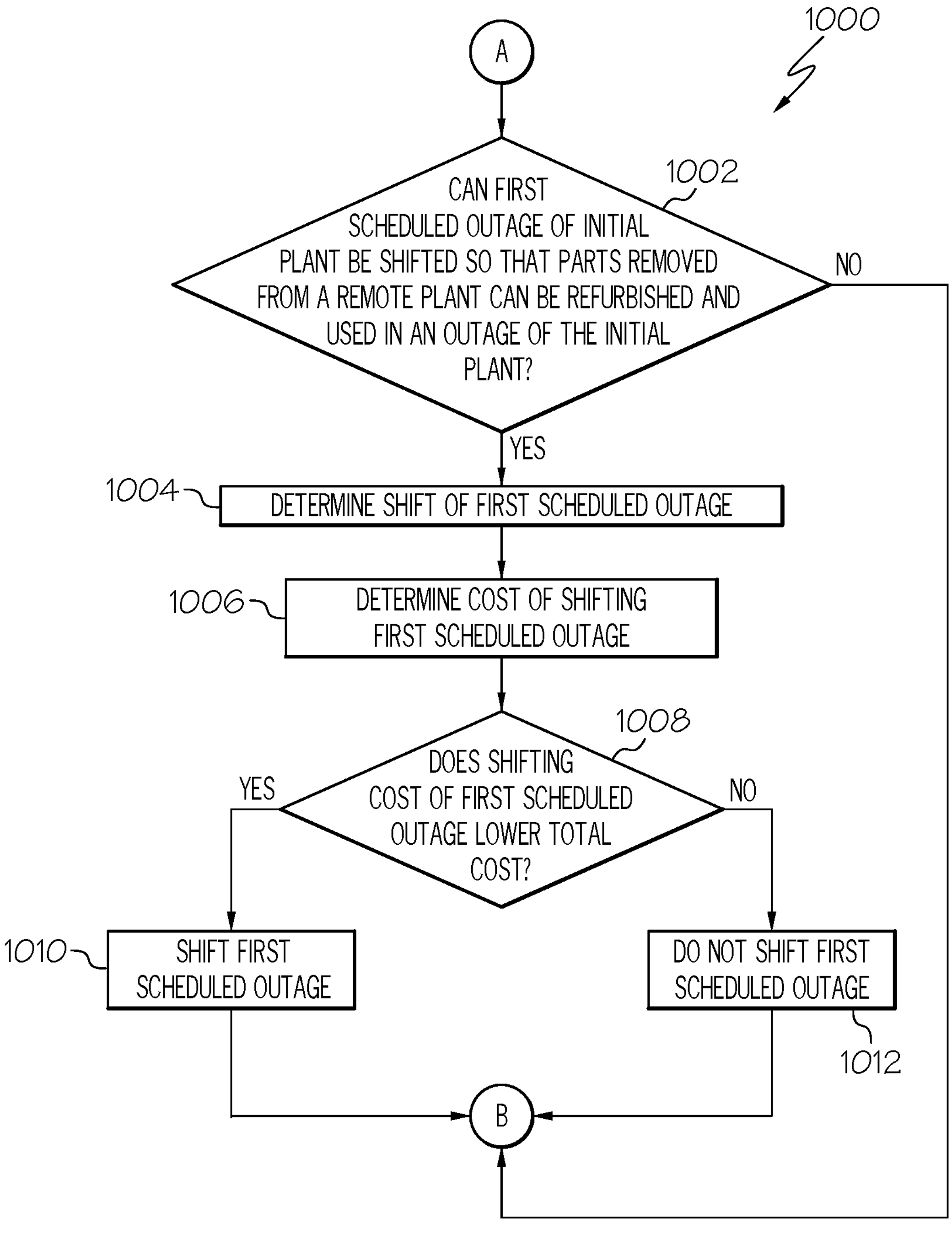
FIG. 10 illustrates an initial plant outage adjustment process, according to an example.

FIG. 10 illustrates an initial plant outage adjustment process 1000, according to an example. The initial plant outage adjustment process 1000 in this illustrated example is performed after determining which remote plant outage to shift, at 922, as is discussed above. In further examples, processing similar to the initial plant outage adjustment process 1000 discussed below is able to be incorporated at any point in the outage schedule modification process 900 discussed above.

The initial plant outage adjustment process 1000 determines, at 1002, if the first outage of the initial plant can be shifted sot that parts removed from any remote plant can be refurbished in time for use in an outage of the initial plant. If this decision is true, a shift of the first schedule outage is determined, at 1004. The amount of this shift is able to be based on any suitable criteria, such as the amount of time needed to refurbish certain particular parts that have been or that are to be removed from a remote plant.

The cost of this shifting of the first scheduled outage is determined, at 1006. This cost is able to be based on several factors. For example, shifting the first scheduled outage may increase the cost of some aspects of the first scheduled outage. Some costs of the first scheduled outage are also able to be decreased, such as by an ability to use refurbished parts based on shifting the time of the first scheduled outage. Shifting of the first scheduled outage may also impact the costs of outer outages, such as subsequently occurring outages that may or may not be able to use parts that are to be refurbished after being removed from the initial plant during the first scheduled outage.

A determination is made in this example, at 1008, if the shift of the first scheduled outage lowers total costs. In general, this determination is able to be based on determining any change in any one or more desired metrics. If this determination is true, the first scheduled outage is shifted, at 1010. If this determination is false, the first scheduled outage is not shifted, at 1012. After shifting or not shifting the first scheduled outage, or if it was determined, at 1002, that the first scheduled outage could not be shifted so that parts removed from a remote plant can be refurbished and used in an outage of the initial plant, the initial plant outage adjustment process 1000 returns, through connector "B" of FIG. 10, to determining, at 908 of FIG. 9, if there are any removed suitable parts from the remote plant that are not able to be refurbished in time for the first scheduled outage.

FIG. 11 illustrates a block diagram illustrating a controller 1100 according to an example. The controller 1100 is an example of a processing subsystem that is able to perform any of the above described processing operations, control operations, other operations, or combinations of these.

The controller 1100 in this example includes a CPU 1104 that is communicatively connected to a main memory 1106 (e.g., volatile memory), a non-volatile memory 1112 to support processing operations. The CPU is further communicatively coupled to a network adapter hardware 1116 to support input and output communications with external computing systems such as through the illustrated network 1130.

The controller 1100 further includes a data input/output (I/O) processor 1114 that is able to be adapted to communicate with any type of equipment, such as the illustrated system components 1128. The data input/output (I/O) processor in various examples is able to be configured to support any type of data communications connections including present day analog and/or digital techniques or via a future communications mechanism. A system bus 1118 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method of managing operational system component replacement, the method comprising:

a) receiving a respective maintenance schedule of respective maintenance activities that are associated with each system within a plurality of systems, the plurality of systems comprising an initial system and a plurality of remote systems that are each different from the initial system;

b) automatically identifying, based on receiving the respective maintenance schedule and based on analysis of the respective maintenance activities, a worn component within the initial system scheduled to be replaced during a first scheduled maintenance activity in the respective maintenance schedule for the initial system;

c) automatically identifying, based on analysis of the respective maintenance schedule associated with the initial system and analysis of each respective maintenance schedule associated with each remote system in the plurality of remote systems, an identified component scheduled to be removed from a selected remote system during a selected remote system maintenance activity within the respective maintenance schedule that is associated with the selected remote system, the identified component being a compatible component able to replace the worn component, the identified component being able to be refurbished after removal from the selected remote system in time for the first scheduled maintenance activity;

d) storing, in association with the identified component, an indication that the identified component is scheduled to be:

removed from the selected remote system during the selected remote system maintenance activity;

refurbished; and installed into the initial system during the first scheduled maintenance activity;

e) determining a modified initial time for the first scheduled maintenance activity associated with the initial system;

f) automatically identifying, based on analysis of the first scheduled maintenance activity occurring at the modified initial time and based on analysis of each respective maintenance schedule for each remote system in the plurality of remote systems, an alternate component scheduled to be removed from an alternate remote system during a respective maintenance activity associated with the alternate remote system so as to be available in time for installation into the initial system during the first scheduled maintenance activity at the modified initial time, g) selecting one of the identified component and the alternate component to be installed into the initial system during the first scheduled maintenance activity;

h) modifying, based on selecting the alternate component, the respective maintenance schedule associated with the alternate remote system to occur at the modified initial time;

i) modifying the indication, based on selecting the alternate component, to indicate that the alternate component is to be:

removed from the alternate remote system during the respective maintenance schedule associated with the alternate remote system;

refurbished; and installed into the initial system during the first scheduled maintenance activity at the modified initial time;

j) receiving a user input identifying at least one metric value to be improved, the at least one metric comprising:

a total of all operating costs of each system in the plurality of systems for which maintenance activities are scheduled, and increasing timely availability of more refurbished parts to be used in scheduled maintenance activities associated with each of the plurality of systems;

k) determining that the at least one metric value has one of:

reached a specified value, or has not improved over a plurality of iterations of steps e) through j); and l) repeating steps e) through k) in response to the at least one metric value not reaching a specified value or the at least one metric value not improving over a plurality of iterations of steps e) through j).

2. The method of claim 1, further comprising:

maintaining a refurbishment time list comprising a respective length of time to refurbish each component within a plurality of components, the plurality of components comprising the identified component, the identifying the identified component being further based on the respective length of time within the refurbishment time list to refurbish the identified component.

3. The method of claim 1, further comprising:

determining at least one respective modified time for each respective remote system maintenance activity that is associated with a respective remote system within the plurality of remote systems, where a respective alternate component is scheduled to be removed in each respective remote system maintenance activity, the respective alternate component being a compatible component for the worn component, each respective modified time being a time different from a time at which its associated respective remote system maintenance activity is scheduled in the respective maintenance schedule of the respective remote system;

selecting, based on each respective remote system maintenance activity occurring at one of its respective modified time, either:

the identified component, or an alternate component scheduled to be removed from an alternate remote system within the plurality of remote systems during a respective remote system activity associated with the alternate remote system where that respective remote system activity occurs at the one of its respective modified time;

modifying, based on selecting the alternate component, the respective remote system maintenance activity for the alternate remote system from which the alternate component is to be removed to occur at the one of its respective modified time; and modifying the indication, based on selecting the alternate component, to indicate that the alternate component is to be:

removed from the alternate remote system during the respective remote system maintenance activity occurring at the one of its respective modified times;

refurbished; and installed into the initial system during the first scheduled maintenance activity.

4. The method of claim 3, further comprising:

defining a remote system scheduled maintenance action within a maintenance manager for the alternate remote system, the remote system scheduled maintenance action ordering the alternate component to be removed from the alternate remote system; and defining a first scheduled maintenance action within the maintenance manager, the first scheduled maintenance action ordering the alternate component to be installed after it is refurbished into the initial system during the first scheduled maintenance activity.

5. The method of claim 1, further comprising:

determining a modified time for an alternate remote system maintenance activity within a respective maintenance schedule that is associated with an alternate remote system in which an alternate component is to be removed from the alternate remote system, the alternate component being a compatible component for the worn component, the modified time being a time different from a time of the alternate remote system maintenance activity that is scheduled in the respective maintenance schedule associated with the alternate remote system;

selecting, based on the alternate remote system maintenance activity occurring at the modified time, one of the identified component and the alternate component to be installed into the initial system during the first scheduled maintenance activity;

modifying, based on selecting the alternate component, the alternate remote system maintenance activity to occur at the modified time within the respective maintenance schedule associated with the alternate remote system; and modifying the indication, based on selecting the alternate component, to indicate that the alternate component is to be:

removed from the alternate remote system during the alternate remote system maintenance activity occurring at the modified time;

refurbished; and installed into the initial system during the first scheduled maintenance activity.

6. The method of claim 5, further comprising:

determining an estimation of requirements for future operations of the plurality of systems, wherein the determining the modified time is based on meeting the estimation of requirements.

7. The method of claim 5, further comprising:

determining a first value of a metric resulting from selecting the identified component; and determining a second value of a metric resulting from selecting the alternate component and modifying to occurrence by the modified time, and the selecting being based at least in part on a difference between the first value and the second value.

8. The method of claim 7, the metric comprising a total cost of maintaining the plurality of systems.

9. The method of claim 1, further comprising providing the respective maintenance schedule and the indication based on determining that the at least one metric value has one of:

reached a specified value, or has not improved over a plurality of iterations of steps e) through j).

10. A system for managing operational system component replacement, the system comprising:

a memory;

a processor, communicatively coupled to the memory, the processor configured to:

a) receive a respective maintenance schedule of respective maintenance activities that are associated with each system within a plurality of systems, the plurality of systems comprising an initial system and a plurality of remote systems that are each different from the initial system;

b) automatically identify, based on receipt of the respective maintenance schedule and based on analysis of the respective maintenance activities a worn component within the initial system scheduled to be replace during a first scheduled maintenance activity in the respective maintenance schedule for the initial system;

c) automatically identify, based on analysis of the respective maintenance schedule associated with the initial system and analysis of each respective maintenance schedule associated with each remote system in the plurality of remote systems, an identified component scheduled to be removed from a selected remote system during a selected remote system maintenance activity within the respective maintenance schedule that is associated with the selected remote system, the identified component being a compatible component able to replace the worn component, the identified component being able to be refurbished after removal from the selected remote system in time for the first scheduled maintenance activity;

d) store into a data storage, in association with the identified component, an indication that the identified component is scheduled to be:

removed from the selected remote system during the selected remote system maintenance activity;

refurbished; and installed into the initial system during the first scheduled maintenance activity;

e) determine a modified initial time for the first scheduled maintenance activity associated with the initial system;

f) automatically identify, based on an analysis of the first scheduled maintenance activity occurring at the modified initial time and based on an analysis of each respective maintenance schedule for each remote system in the plurality of remote systems, an alternate component scheduled to be removed from an alternate remote system during a respective maintenance activity associated with the alternate remote system so as to be available in time for installation into the initial system during the first scheduled maintenance activity at the modified initial time, g) select one of the identified component and the alternate component to be installed into the initial system during the first scheduled maintenance activity;

h) modify, based on selecting the alternate component, the respective maintenance schedule associated with the alternate remote system to occur at the modified initial time; and i) modify the indication, based on selecting the alternate component, to indicate that the alternate component is to be:

removed from the alternate remote system during the respective maintenance schedule associated with the alternate remote system;

refurbished; and installed into the initial system during the first scheduled maintenance activity at the modified initial time;

j) receive a user input identifying at least one metric value to be improved, the at least one metric comprising:

a total of all operating costs of each system in the plurality of systems for which maintenance activities are scheduled, and increasing timely availability of more refurbished parts to be used in scheduled maintenance activities associated with each of the plurality of systems;

k) determine that the at least one metric value has one of:

reached a specified value, or has not improved over a plurality of iterations of steps e) through j); and l) repeat steps e) through k) in response to the at least one metric value not reaching a specified value or the at least one metric value not improving over a plurality of iterations of steps e) through j).

11. The system of claim 10, the processor further configured to:

maintain a refurbishment time list comprising a respective length of time to refurbish each component within a plurality of components, the plurality of components comprising the identified component, the processor being configured to identify the identified component based further on the respective length of time within the refurbishment time list to refurbish the identified component.

12. The system of claim 10, the processor further configured to:

determine at least one respective modified time for each respective remote system maintenance activity that is associated with a respective remote system within the plurality of remote systems, where a respective alternate component is scheduled to be removed in each respective remote system maintenance activity, the respective alternate component being a compatible component for the worn component, each respective modified time being a time different from a time at which its associated respective remote system maintenance activity is scheduled in the respective maintenance schedule of the respective remote system;

select, based on each respective remote system maintenance activity occurring at one of its respective modified time, either:

the identified component, or an alternate component scheduled to be removed from an alternate remote system within the plurality of remote systems during a respective remote system activity associated with the alternate remote system where that respective remote system activity occurs at the one of its respective modified time;

modify, based on selecting the alternate component, the respective remote system maintenance activity for the alternate remote system from which the alternate component is to be removed to occur at the one of its respective modified time; and modify the indication, based on selecting the alternate component, to indicate that the alternate component is to be:

removed from the alternate remote system during the respective remote system maintenance activity occurring at the one of its respective modified times;

refurbished; and installed into the initial system during the first scheduled maintenance activity.

13. The system of claim 10, the processor further configured to:

determine a modified time for an alternate remote system maintenance activity within a respective maintenance schedule that is associated with an alternate remote system in which an alternate component is to be removed from the alternate remote system, the alternate component being a compatible component for the worn component, the modified time being a time different from a time of the alternate remote system maintenance activity that is scheduled in the respective maintenance schedule associated with the alternate remote system;

select, based on the alternate remote system maintenance activity occurring at the modified time, one of the identified component and the alternate component to be installed into the initial system during the first scheduled maintenance activity;

modify, based on selecting the alternate component, the alternate remote system maintenance activity to occur at the modified time within the respective maintenance schedule associated with the alternate remote system; and modify the indication, based on selecting the alternate component, to indicate that the alternate component is to be:

removed from the alternate remote system during the alternate remote system maintenance activity occurring at the modified time;

refurbished; and installed into the initial system during the first scheduled maintenance activity.

14. The system of claim 13, the processor further configured to:

determine an estimation of requirements for future operations of the plurality of systems, wherein determination of the modified time is based on meeting the estimation of requirements.

15. The system of claim 13, the processor further configured to:

determine a first value of a metric resulting from selecting the identified component; and determine a second value of a metric resulting from selecting the alternate component and modifying to occurrence by the modified time, and the processing being configured to select one of the identified component and the alternate component based at least in part on a difference between the first value and the second value.

16. The system of claim 15, the metric comprising a total cost of maintaining the plurality of systems.

17. A computer program product for managing operational system component replacement, the computer program product comprising:

a computer readable storage medium having computer readable program code embodied therewith, the computer readable program code comprising instructions for:

a) receiving a respective maintenance schedule of respective maintenance activities that are associated with each system within a plurality of systems, the plurality of systems comprising an initial system and a plurality of remote systems that are each different from the initial system;

b) automatically identifying, based on receiving the respective maintenance schedule and based on analysis of the respective maintenance activities, a worn component within the initial system scheduled to be replaced during a first scheduled maintenance activity in the respective maintenance schedule for the initial system;

c) automatically identifying, based on analysis of the respective maintenance schedule associated with the initial system and analysis of each respective maintenance schedule associated with each remote system in the plurality of remote systems, an identified component scheduled to be removed from a selected remote system during a selected remote system maintenance activity within the respective maintenance schedule that is associated with the selected remote system, the identified component being a compatible component able to replace the worn component, the identified component being able to be refurbished after removal from the selected remote system in time for the first scheduled maintenance activity;

d) storing, in association with the identified component, an indication that the identified component is scheduled to be:

removed from the selected remote system during the selected remote system maintenance activity;

refurbished; and installed into the initial system during the first scheduled maintenance activity;

e) determining a modified initial time for the first scheduled maintenance activity associated with the initial system;

f) automatically identifying, based on analysis of the first scheduled maintenance activity occurring at the modified initial time and based on analysis of each respective maintenance schedule for each remote system in the plurality of remote systems, an alternate component scheduled to be removed from an alternate remote system during a respective maintenance activity associated with the alternate remote system so as to be available in time for installation into the initial system during the first scheduled maintenance activity at the modified initial time, g) selecting one of the identified component and the alternate component to be installed into the initial system during the first scheduled maintenance activity;

h) modifying, based on selecting the alternate component, the respective maintenance schedule associated with the alternate remote system to occur at the modified initial time; and i) modifying the indication, based on selecting the alternate component, to indicate that the alternate component is to be:

removed from the alternate remote system during the respective maintenance schedule associated with the alternate remote system;

refurbished; and installed into the initial system during the first scheduled maintenance activity at the modified initial time;

j) receiving a user input identifying at least one metric value to be improved, the at least one metric comprising:

a total of all operating costs of each system in the plurality of systems for which maintenance activities are scheduled, and increasing timely availability of more refurbished parts to be used in scheduled maintenance activities associated with each of the plurality of systems;

k) determining that the at least one metric value has one of:

reached a specified value, or has not improved over a plurality of iterations of steps e) through j); and l) repeating steps e) through k) in response to the at least one metric value not reaching a specified value or the at least one metric value not improving over a plurality of iterations of steps e) through j).

18. The computer program product of claim 17, the computer readable program code further comprising instructions for:

determining a modified time for the first scheduled maintenance activity associated with the initial system;

identifying, based on the first scheduled maintenance activity occurring at the modified time and based on each respective maintenance schedule for each remote system in the plurality of remote systems, an alternate component scheduled to be removed from an alternate remote system during a respective maintenance activity associated with the alternate remote system so as to be available in time for installation into the initial system during the first scheduled maintenance activity at the modified time, selecting one of the identified component and the alternate component to be installed into the initial system during the first scheduled maintenance activity;

modifying, based on selecting the alternate component, the respective maintenance schedule associated with the alternate remote system to occur at the modified time; and modifying the indication, based on selecting the alternate component, to indicate that the alternate component is to be:

removed from the alternate remote system during the respective maintenance schedule associated with the alternate remote system;

refurbished; and installed into the initial system during the first scheduled maintenance activity at the modified time.

* * * * *